May 3, 1932.  A. O. AUSTIN  1,856,122
ELECTROSTATIC COUPLING
Filed Feb. 19, 1929   2 Sheets-Sheet 1

INVENTOR
Arthur O Austin
BY
ATTORNEY

May 3, 1932.   A. O. AUSTIN   1,856,122
ELECTROSTATIC COUPLING
Filed Feb. 19, 1929   2 Sheets-Sheet 2

INVENTOR
Arthur O. Austin.
BY
ATTORNEY

Patented May 3, 1932

1,856,122

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

ELECTROSTATIC COUPLING

Application filed February 19, 1929. Serial No. 341,181.

This invention relates to couplings for connection with high potential transmission lines and especially to electrostatic couplings employing the insulation formed by the bushings through which the lines pass.

One object of the invention is to provide an electrostatic coupling which is applicable to bushing insulators any by means of which a larger volt-ampere output can be diverted from the conductor than has heretofore been practical with devices for this purpose.

A further object is to provide an electrostatic coupling for bushing insulators which will not materially reduce the insulating properties of the insulators and which may increase such properties.

Other objects and advantages will appear from the following description.

The invention is exemplified in the combination and arrangement of parts shown in the accompanying drawings and described in the following specification, and it is more particularly pointed out in the appended claims.

While conducting joints or cylinders located within bushings have been used for electrostatic couplings, this practice results in a reduction in the insulation furnished by the bushing. This is particularly true where a capacity sleeve is utilized which is placed in an intermediate position between a grounded sleeve and the conductor located at the center of the bushing. In order to have a sufficient voltampere capacity, it is necessary to place the electrostatic sleeve some distance from the grounded outer sleeve or conducting member. Since the charging current of the electrostatic sleeve is very small at best, it is necessary to develop an appreciable voltage between this sleeve and ground or the adjacent ground sleeve in order to provide a sufficient voltampere capacity. This necessitates an appreciable distance between the electrostatic sleeve and the ground sleeve, thereby reducing the effective insulation possible with a given diameter of bushing.

With my present invention, it is possible not only to equip many existing bushings now in service with electrostatic couplings, but, in addition, it is possible to provide an electrostatic coupling without decreasing the effective insulation or dielectric strength of the bushing and it is further possible to increase the electrostatic capacity very materially over that possible where an intermediate capacity sleeve is used. The improved construction also makes it possible to use an intermediate electrostatic screen without lowering the effective insulation for certain classes of disturbances and also to provide electrostatic coupling without materially increasing the diameter of the bushings in most cases.

Figure 1:
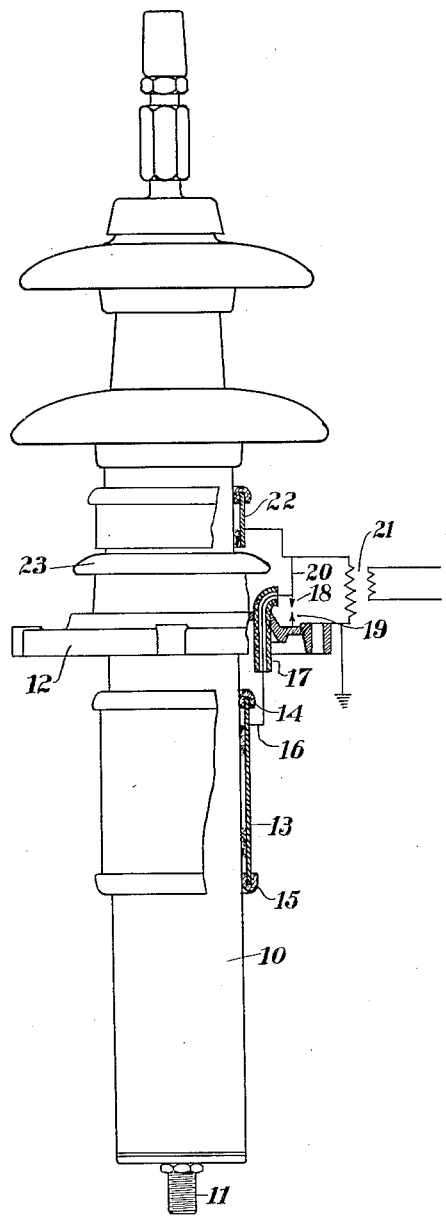
Fig. 1 is an elevation with parts in section and parts shown diagrammatically illustrating one form of the present invention.

Fig. 1 shows one form of the invention in which a porcelain bushing having a body member 10 and equipped with a conducting member 11 passing through the bushing is provided with the usual mounting flange 12. In addition, a zone below the mounting flange is covered by an electrostatic sleeve or screen 13. This electrostatic screen may comprise a thin sheet of conducting material and is insulated from the mounting flange 12. The ends of the sleeve 13 may be covered with insulating coverings 14 and 15 of the insulated control type. Attached to the sleeve 13 is a lead 16 which passes through an insulating bushing 17 placed in the flange. After passing through the bushing 17 the lead is provided with one part 18 of a discharge gap and the flange provided with an accompanying part 19 of the discharge gap. The extended portion of the lead 20 may then be carried to any place where it is desired to use the charging current. As the current is very limited, it is usually preferable however to install a transformer 21 stepping down the voltage after which the electrostatic absorption will be very small. This arrangement will make the maximum voltampere capacity available and at the same time will permit of a high degree of reliability without necessarily reducing the effective insulation of the bushing. Under a high frequency disturbance where the induced voltage is high which might tend to break down the high voltage winding in the stepdown transformer 21, the excess voltage will jump the two parts of the protecting gap 18 and 19. This gap may be located at any suitable point, but if placed near the bushings and the leads are heavy, a flashover followed by a power arc will not be likely to cause serious damage as in the case where this gap is placed at a considerable distance or at the end of a small lead. If desired, an electrostatic screen 22 may be placed above the flange and connected to the transformer or lead from the sleeve 13. In order to insure maximum insulation between the sleeve 22 and the ground flange 12, a weather shed 23 may be used to supply this insulation. The electrostatic sleeves may be placed in insulation if desired or may be made up in sections covered with insulation. These capacity cells may be placed around the bushing and attached in any convenient way, the only provision being that the inner capacity layer must be insulated from ground until the charging current is caused to flow through the transformer or utilized directly. With the insulated control provided by these capacity cells, the insulation of the bushing is not necessarily reduced, but may be improved.

Figure 2:
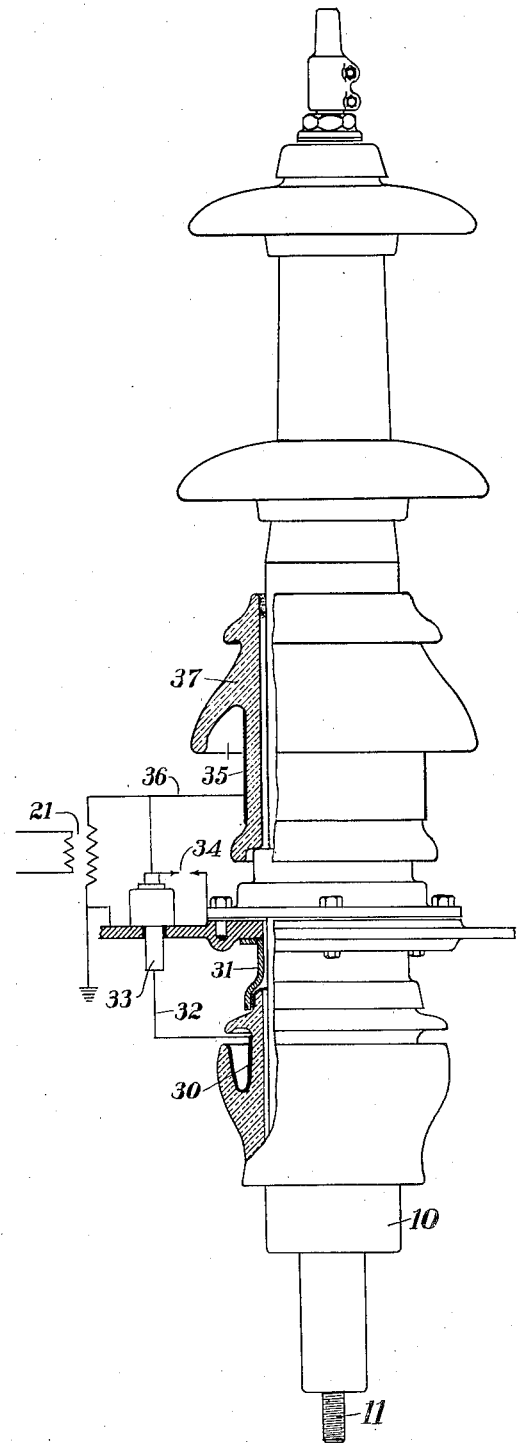
Figs. 2, 3 and 4 are each views similar to Fig. 1 but showing different modifications of the invention.

Another form of the invention is shown in Fig. 2 in which a conducting coating 30 of the control is insulated from the mounting sleeve or flange 31. Where necessary to carry the lead 32 from the coating 30 through a transformer or circuit breaker case, the lead may be brought through a suitable bushing 33 insulating it from ground. Where it is possible to provide an insulating zone along the body of the bushing between the sleeve 31 and the grounded case, the electrostatic capacity of the flange or holding member 31 may also be used. In this case the flange 31 may be provided with a supporting insulator ring similar to that shown at 42 in Fig. 3.

The lead 32 after passing through the bushing is shown connected to a transformer 21 similar to that in Fig. 1. A limiting gap 34 is provided so that the stepdown transformer will not be broken down and so that charging current may be readily applied to the conducting surfaces of the insulated control under very severe conditions where the bushings may be subjected to high voltages or high frequencies or surges of steep wave front.

An electrostatic capacity may also be provided above the bushing flange. The conducting member or coating 35 is covered by the insulating member 37 which may be of any suitable form. The conducting member 35 is of necessity insulated from ground and connected to the transformer circuit by a lead 36. The insulated control member formed by the conducting member 35 and insulating member 37 will increase the flashover of the bushing and tend to reduce the maximum electrostatic stress existing in the dielectric of the main bushing member. This portion of the bushing may be an integral part of the main member or added as a separate member. Where added as a separate member, the manufacture and cost of the bushing is not affected and when an integral part of the bushing the increased rating of the bushing may easily compensate for the increased cost of manufacture.

As the electrostatic members shown in the various forms can extend well up into the field set up by the charged conductor, it is seen that the electrostatic capacity is fairly large considering the thicknesses of the dielectrics interposed.

Figure 3:
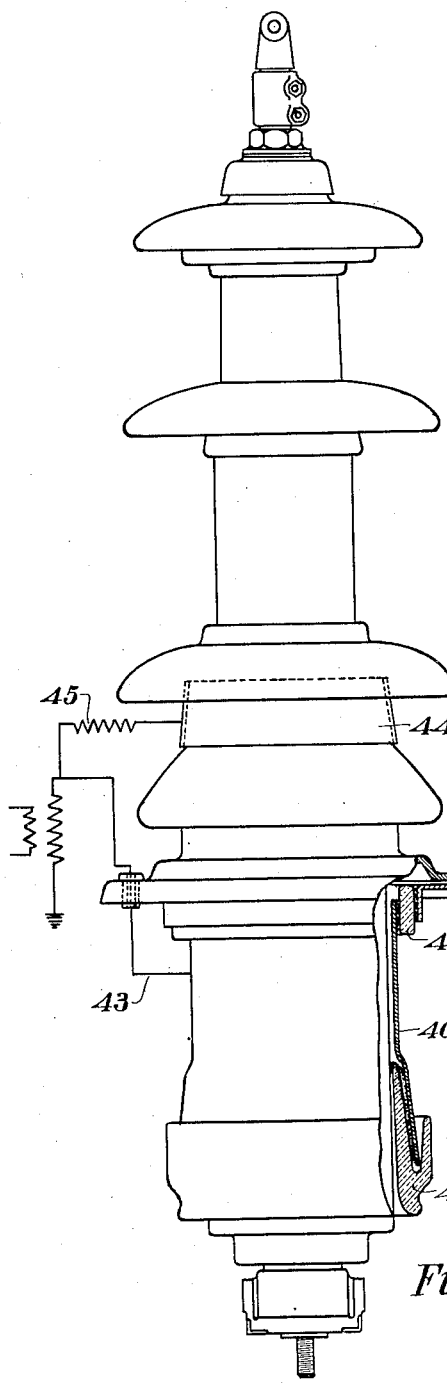

Fig. 3 shows the electrostatic capacity sleeve 40 terminated by an insulated control member 41 and insulated from its mounting flange by a dielectric sleeve 42. This arrangement utilizes the sleeve and insulated control which may have to be provided for other purposes. The lead 43 may be brought out in the usual way. In place of or in addition to the electrostatic coupling below the flange, an electrostatic sleeve 44 may be placed in an insulated zone above the flange. If this sleeve be connected to the lead through a high resistance 45 or to a transformer which has sufficiently high insulation, the existence of this sleeve will not materially lower the flashover voltage of the bushing. This resistance 45 may be of any suitable type such as a very high resistance rod used for certain classes of lightning arresters or a high resistance liquid resistance, preferably of a non-freezing type. Limiting gaps may be used if desired or dispensed with where the insulation of the transformer will withstand the impressed voltage under severe conditions or where the resistance 45 will produce sufficient back E. M. F. so that the transformer or connected apparatus will not be damaged.

Figure 4:
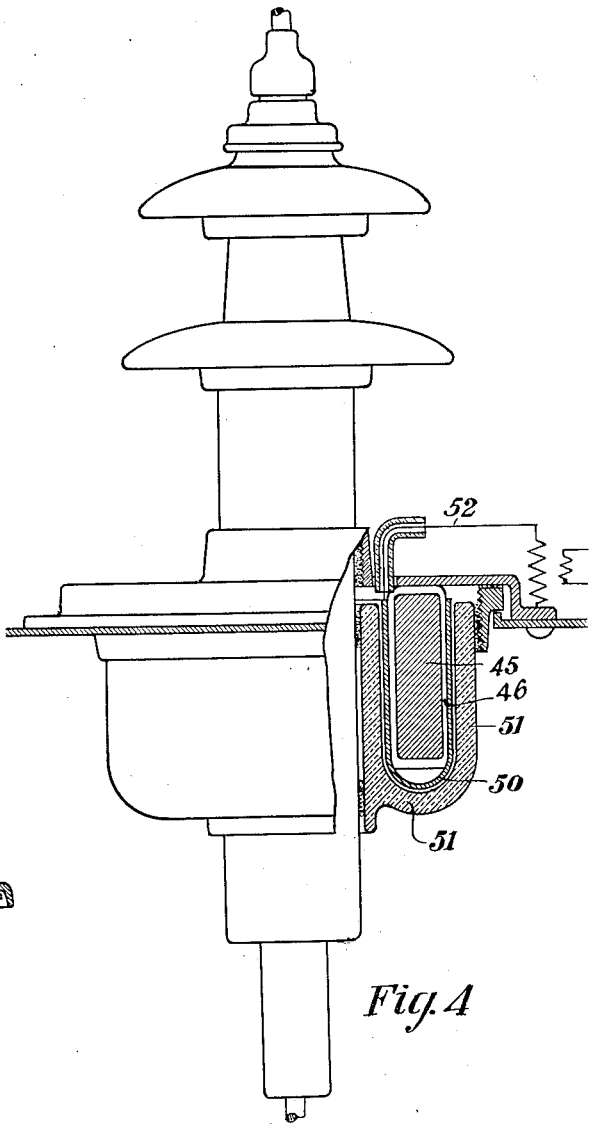

In addition to the above forms, the electrostatic coupling may be used in connection with current transformers located either inside or outside of the bushing. Fig. 4 shows one form of the invention where the electrostatic coupling may be provided with a current transformer having a core 45 and a secondary winding disposed in space 46 and located outside of the bushing. In this figure the electrostatic sheath 50 is insulated from ground by the dielectric member 51. This conducting sheath is provided with a lead 52 brought out through the supporting flange. While the presence of the current transformer may lower the effective capacity coupling, it is sometimes possible to insulate the windings of the current transformer from ground so that the electrostatic charging current of the transformer will reduce the effective capacity of the member 50 but little and in fact may be connected directly to this layer or used in itself. In this case it is usually necessary to place another current transformer near the bushing which has a relatively low electrostatic capacity. In many cases amplifying means are used.

In some cases, it is necessary to increase the height of the bushings in order to provide sufficient clearance between the leads entering a circuit breaker or transformer or to remove the live parts sufficiently far from projections on the circuit breaker or conservator tanks as in the case of transformers. The extra space can be readily utilized above the flange for a capacity coupling and when equipped with an insulated control, the properties of the bushing may be improved, as surface charging current can be materially reduced. In many forms it is possible to make the insulated control and capacity coupling an integral part of the bushing. This method is particularly applicable where space is limited or exceedingly high flashover voltages or high corona point is desired. In these cases, the insulated control member simply becomes an integral part of the main insulating members. The fact, however, that these may be utilized as separate members to improve the properties of the bushing is a material advantage from the standpoint of manufacture and in the application to existing types.

I claim:

1. The combination with a grounded support, of a bushing insulator extending through said support, a conductor extending through said insulator and a cover of conducting material disposed about the outer surface of said bushing insulator and spaced from said support, said cover having the extremity thereof farthest from said support enclosed in insulation which extends outwardly beyond the outer surface of that portion of the bushing insulator in longitudinal registration with said cover, and a conductor lead connected with said cover to enable said cover to be used as an electrostatic coupling with said conductor while said cover serves also as a flux control member for said insulator and the enclosing insulation for the extremity of said cover serves to maintain the flashover value of said bushing insulator, notwithstanding the presence of the conductor cover between the terminal of said bushing insulator and its grounded support.

2. The combination with a bushing insulator and a high potential conductor extending therethrough, of a capacitance member of conducting material disposed about the outer surface of said insulator, a covering of dielectric material extending radially beyond said outer surface and disposed between said capacitance member and one end of said insulator, and a conductor lead for diverting energy from said high potential conductor through the condenser formed by said high potential conductor, bushing insulator and capacitance member.

3. The combination with a grounded support, of a bushing insulator extending through said support, a high potential conductor extending through said insulator, a capacitance member of conducting material disposed about the outer surface of said bushing insulator at one side of said grounded support and insulated from said grounded support, a covering of dielectric material enclosing the extremity of said capacitance member farthest away from said grounded support and projecting radially from said insulator past the extremity of said capacitance member, and a conductor lead connected with said capacitance member for diverting energy from said high potential conductor through the condenser formed by said high potential conductor, bushing insulator and capacitance member.

4. The combination with a housing cover, of a bushing insulator extending through said cover, a high potential conductor extending through said bushing insulator, a capacitance member of conducting material disposed about the outer surface of said bushing insulator above said cover and insulated from said cover, a dielectric flange projecting radially from said outer surface above said capacitance member and between said member and the upper end of said insulator, and a conductor lead connected with said capacitance member for diverting energy from said high potential conductor.

5. The combination with a grounded housing member, of a bushing insulator extending through said housing member, a high potential conductor extending through said bushing insulator, a capacitance member disposed about the outer surface of said bushing insulator above said housing member, a dielectric flange projecting radially from said outer surface above said capacitance member and forming a covering for the upper extremity of said capacitance member, and a lead connected with said capacitance member for diverting electrical energy therefrom.

6. The combination with a grounded housing member, of a bushing insulator extending through said housing member, a high potential conductor extending through said insulator, a capacitance member of conducting material disposed about the outer surface of said bushing insulator, dielectric material covering the upper extremity of said capacitance member, a dielectric baffle interposed between the lower extremity of said capacitance member and said housing, and a lead connected with said capacitance member.

7. The combination with a grounded support, of a bushing insulator extending through said support, a high potential conductor extending through said insulator, electrostatic flux control members comprising conductor coverings on the outer surface of said insulator and disposed at opposite sides of said grounded support and outside of the outer surface of said insulator and having their outer extremities covered with dielectric material disposed outside of the outer surface of said insulator, said flux control members being insulated from said grounded support and leads connected with said flux control members for diverting electrical energy therefrom through the electrostatic coupling formed with said high potential conductor by said flux control members.

8. In combination a housing cover having an opening therethrough, a conductor extending through said opening, a bushing insulator disposed about said conductor and insulating said conductor from said cover, a supplemental ring of dielectric material disposed about said bushing insulator at one side of said cover, said ring having a groove therein with its open side facing said cover, a capacitance member comprising a sheet of conducting material disposed outside of said bushing insulator and having one extremity thereof extending into said groove, and a lead connected with said capacitance member.

9. The combination with a wall, of a bushing insulator extending through said wall, a conductor extending through said bushing insulator, a capacitance member suspended from said wall and surrounding the portion of the bushing insulator below said wall, means for insulating said capacitance member from said wall, a covering of dielectric material enclosing the lower extremity of said capacitance member, and a conductor lead connected with said capacitance member.

10. The combination with a wall, of a bushing insulator extending through said wall, a conductor extending through said bushing insulator, a capacitance member surrounding said bushing insulator below said wall and insulated from said wall, a covering of dielectric material enclosing the lower extremity of said capacitance member, a second capacitance member surrounding said bushing insulator above said wall and insulated from said wall, a covering of dielectric material enclosing the upper extremity of said last named capacitance member, and a conductor lead connected to both of said capacitance members.

In testimony whereof I have signed my name to this specification this 18th day of February, A. D. 1929.

ARTHUR O. AUSTIN.